United States Patent
Stoebe et al.

(10) Patent No.: US 9,508,371 B2
(45) Date of Patent: Nov. 29, 2016

(54) SLIDER AND/OR HARD DISC INCLUDING COATING, AND OPTIONALLY ONE OR MORE ADDITIVES THAT CAN DISSIPATE ELECTRICAL CHARGE

(71) Applicant: Seagate Technology LLC, Cupertino, CA (US)

(72) Inventors: Tim Stoebe, Minnetonka, MN (US); Dan Olson, Minneapolis, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/704,731

(22) Filed: May 5, 2015

(65) Prior Publication Data
US 2015/0325263 A1   Nov. 12, 2015

Related U.S. Application Data

(60) Provisional application No. 61/989,169, filed on May 6, 2014.

(51) Int. Cl.
| | | |
|---|---|---|
| G11B 5/60 | (2006.01) | |
| G11B 5/72 | (2006.01) | |
| G11B 5/725 | (2006.01) | |

(52) U.S. Cl.
CPC ............... *G11B 5/60* (2013.01); *G11B 5/6082* (2013.01); *G11B 5/6094* (2013.01); *G11B 5/72* (2013.01); *G11B 5/725* (2013.01)

(58) Field of Classification Search
None
See application file for complete search history.

(56) References Cited

U.S. PATENT DOCUMENTS

| | | | |
|---|---|---|---|
| 5,534,322 A * | 7/1996 | Ueyama | G11B 5/7315 428/447 |
| 5,654,850 A * | 8/1997 | Ganapathi | G11B 5/10 360/122 |
| 5,744,431 A | 4/1998 | Diaz et al. | |
| 5,907,456 A | 5/1999 | Khan et al. | |
| 6,312,798 B1 | 11/2001 | Ma et al. | |
| 6,995,958 B2 | 2/2006 | Zhu | |
| 7,016,139 B2 | 3/2006 | Baumgart et al. | |
| 7,041,374 B1 * | 5/2006 | Nelson | C08G 18/10 252/500 |
| 7,046,473 B2 | 5/2006 | Fu et al. | |
| 7,212,376 B2 | 5/2007 | Burns et a | |
| 7,746,600 B2 * | 6/2010 | Hancer | G11B 5/5552 360/294.4 |
| 8,159,790 B2 * | 4/2012 | Tan | G11B 5/40 360/323 |
| 8,630,057 B2 | 1/2014 | Murthy et al. | |
| 8,742,047 B2 * | 6/2014 | Lewandowski | C07C 219/06 522/150 |
| 2008/0124580 A1 | 5/2008 | Musashi et al. | |
| 2011/0157736 A1 | 6/2011 | Contreras et al. | |
| 2013/0083422 A1 | 4/2013 | Ooeda et al. | |
| 2015/0002960 A1 | 1/2015 | Stoebe et al. | |

OTHER PUBLICATIONS

Nonnenmacher, M. et al., (1991) *Kelvin probe force microscopy*, Applied Physics Letters 58: p. 2921-2923.
Feng, Z. et al., (1999) *A study of tribo-charge/emission at the head-disk interface*, Journal of Applied Physics 85: p. 5615-5617.

(Continued)

*Primary Examiner* — K. Wong
(74) *Attorney, Agent, or Firm* — Kagan Binder, PLLC (57) ABSTRACT

The present disclosure relates to reducing a potential difference among a slider body and a hard disc drive platter by providing a hard disc drive platter and/or slider body with a coating that includes one or more additives that can dissipate electrical charge.

16 Claims, 9 Drawing Sheets

(56) References Cited

OTHER PUBLICATIONS

U.S. Appl. No. 14/139,438, filed Dec. 2013, Ramakrishnan et al.
Feng, Z. et al., "A study of electrical charge at head-disk interface", Tribology Letters 18(1) (2005); p. 53-57.

Kiely, J.D. et al., "Tribocharging of the magnetic hard disk drive head-disk interface", Journal of Applied Physics 91(7) (2002); p. 4631-4636.
Zhang, Mingsheng et al., "Measurement of contact potential in head disk interface by readback signal spectrum", Microsyst Technol 18 (2012); p. 599-602.

* cited by examiner

SLIDER AND/OR HARD DISC INCLUDING COATING, AND OPTIONALLY ONE OR MORE ADDITIVES THAT CAN DISSIPATE ELECTRICAL CHARGE

PRIORITY CLAIM

The present non-provisional application claims the benefit of commonly owned provisional Application having Ser. No. 61/989,169, filed on May 6, 2014, which provisional application is incorporated herein by reference in its entirety.

BACKGROUND

Hard disc drives are common information storage devices having of a series of rotatable discs (also referred to as hard disc drive platters) that are accessed by magnetic reading and writing elements, commonly referred to as transducers, heads, or transducing heads. Air-bearing sliders can be used in hard disc drives to appropriately position a transducing head above a rotating magnetic disc. During operation, the disc typically rotates at high speeds, which can generate a stream of air flow immediately adjacent to the flat surface of the disc. This stream of air acts upon a lower air-bearing surface of the air-bearing face of the slider and can generate a force directing the slider away from the disc and against a load beam causing the slider to "fly" a small distance above the disc.

SUMMARY

In the magnetic hard-drive industry, to help promote effective data storage a slider body (i.e., head) supporting a magnetic transducer is often positioned in close proximity to the magnetic media (i.e., disc) at least during a portion of the data transfer operation. As the media (i.e., disc) rotates under the head, charge transfer can occur leading to a tribocharging effect and a net potential difference between the head and the disc. Charge transfer and electrostatic potential difference between the head and the disc may contribute to one or more drive failure modes including: electrostatic discharge between the head and disc causing damage to the transducer or media; large electric field induced degradation of media lubricant; increased electrostatic attraction between the head and the disc leading to head-disc interface mechanical failure and head crashing.

The present invention involves selecting coating chemistry at the interface of a hard disc and a corresponding slider to reduce or eliminate a potential difference between the slider and the disc due to, e.g., tribocharging. For example, one aspect of the present invention is directed to selecting the appropriate chemistry of a lubricant and/or a self-assembled monolayer to reduce or eliminate a potential difference between the slider and the disc due to, e.g., tribocharging. Also, another aspect of the present invention is directed to reducing or eliminating a potential difference between the slider and the disc due to, e.g., tribocharging by including one or more chemical additives in a coating to dissipate electrostatic charge. The coating can be applied to the disc and/or the slider.

DETAILED DESCRIPTION

Figure 1:
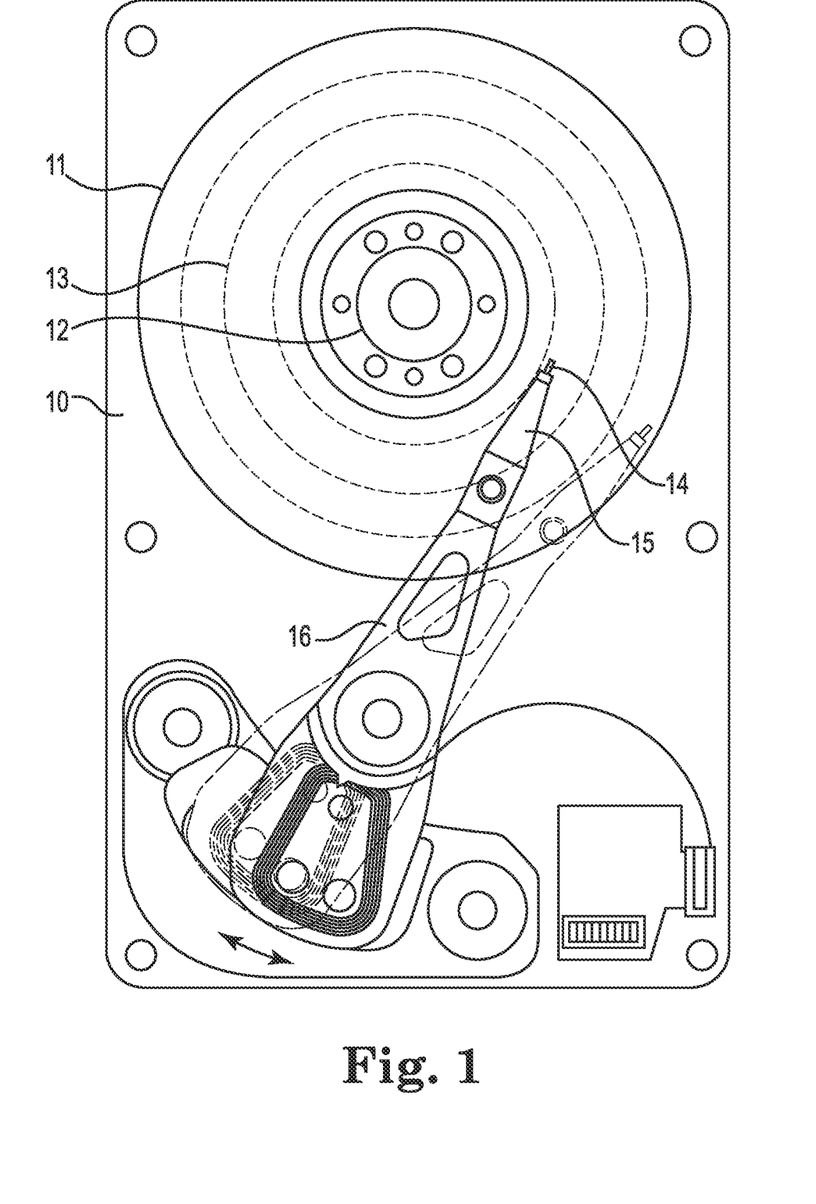
FIG. 1 shows a schematic top view of a hard disc drive.

Referring to FIG. 1, an exemplary magnetic disc drive 100 is schematically illustrated. Disc drive 100 includes a base 102 and a top cover 104, shown partially cut away. Base 102 combines with top cover 104 to form a housing 106, in which is located one or more rotatable magnetic data storage media or discs 108 (also referred to as disc drive platters). As shown, magnetic storage media 108 are attached to spindle 114 for co-rotation about a central axis. It is noted that a pack of multiple discs or media 108 can be utilized in some embodiments, whereas only a single disc or medium 108 can be used in other embodiments. Each disc or medium surface has an associated head or slider 112 which is mounted adjacent to and in communication with its corresponding disc or medium 108. Head or slider 112 includes a data reading transducer (also referred to as a read head) and a data recording transducer (also referred to as a write head), which read and write data to storage disc or medium 108. In the example shown in FIG. 1, head or slider 112 is supported by an actuator assembly 110, composed of various elements that are known in the field of disc drives. The actuator assembly 110 shown in FIG. 1 is of the type known as a rotary moving coil actuator and includes a voice coil motor to rotate actuator assembly 110 with its attached slider 112 to position slider 112 and its read/write heads over a desired data track along an arcuate path between an inner diameter and an outer diameter of disc of medium 108.

Magnetic storage media 108 can store information as magnetically oriented bits in a magnetic recording layer. In operation, the data recording transducer (write head) can generate magnetic fields sufficient to magnetize discrete domains of magnetic storage medium 108. These discrete domains of the magnetic film each represent a bit of data, with one magnetic orientation representing a "0" and a substantially opposite magnetic orientation representing a "1." The data reading transducer (read head) of slider 112 is capable of detecting the magnetic fields of the discrete magnetic domains of the magnetic film.

Figure 2:
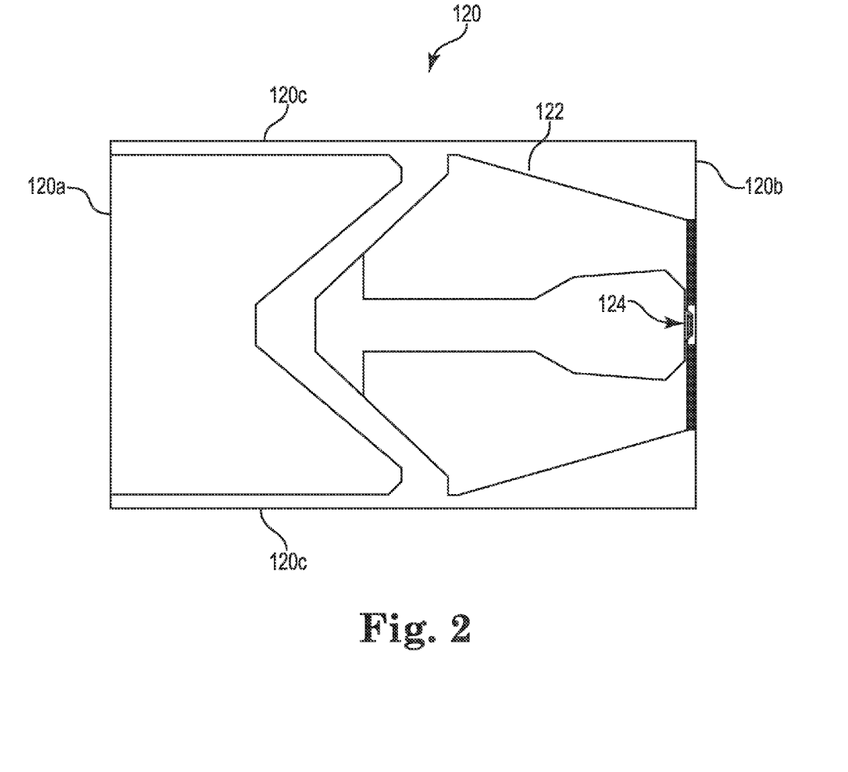
FIG. 2 shows a schematic bottom view of an exemplary slider body.

FIG. 2 shows a schematic diagram of a typical air-bearing slider body 120 of a magnetic recording head, which includes air-bearing face 122 defined by leading edge 120*a*, trailing edge 120*b*, and two side edges 120*c* connecting the leading and trailing edges.

Air-bearing slider 120 also includes transducing head 124. As shown in FIG. 2, transducing head 124 is arranged toward trailing edge 120*b* of slider body 120. Air-bearing face 122 can be designed to control the aerodynamic performance of slider body 120 as it flies over a rotating magnetic disc. As shown, air-bearing face 122 includes structural features such as rails, lands, ramps, depressions and the like that are typically designed to maximize the pressure on air-bearing surfaces of the air-bearing face created by the stream of air flowing between face 122 and the disc near transducer 124. Causing pressure at transducer 124 to be relatively high can help increase the stiffness of the suspension assembly (not shown) of the magnetic recording head at transducer 124. Increasing the stiffness can cause the suspension assembly, e.g. an actuator arm, and thereby the recording head, to be less subject to system vibration during operation, which in turn can minimize fly height sensitivity to manufacturing variation, environmental factors, and disk roughness.

Figure 3:
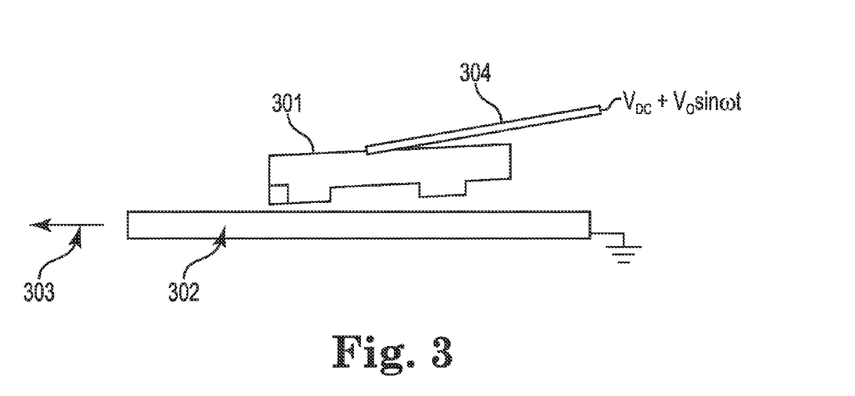
FIG. 3 shows a schematic elevation view of a slider positioned over a disc.

In the magnetic hard-drive industry, to help promote effective data storage a slider body (i.e., head) supporting a magnetic transducer is often positioned in close proximity to the magnetic media (i.e., disc) at least during a portion of the data transfer operation. As the media (i.e., disc) rotates under the head, charge transfer can occur leading to a tribocharging effect and a net potential difference between the head and the disc. Tribocharging can be described as frictional electrification of materials on a disc and/or slider body. (See, for example, J. D. Kiely et al., "Tribocharging of the magnetic hard disk drive head-disk interface," Journal of Applied Physics, Vol. 91, No. 7, pp. 4631 4636, Apr. 1, 2002). Charge transfer and electrostatic potential difference between the head and the disc may contribute to one or more drive failure modes including: electrostatic discharge between the head and disc causing damage to the transducer or media; large electric field induced degradation of media lubricant; increased electrostatic attraction between the head and the disc leading to head-disc interface mechanical failure and head crashing. Such tribocharging is further illustrated by reference to FIG. 3. FIG. 3 shows a schematic elevation view of a slider body 301 positioned over a disc 302, where a suspension 304 supports slider body 301. As disc 302 rotates, disc 302 moves from right to left with respect to slider body 301, as indicated by arrow 303, charge transfer can occur leading to a tribocharging effect and a net potential difference between slider body 301 and the disc 302.

The present invention is directed to selecting coating chemistry at the interface of a hard disc and a corresponding slider to reduce or eliminate a potential difference between the slider and the disc due to, e.g., tribocharging. The coating can be applied to the disc and/or the slider.

Figure 4A:
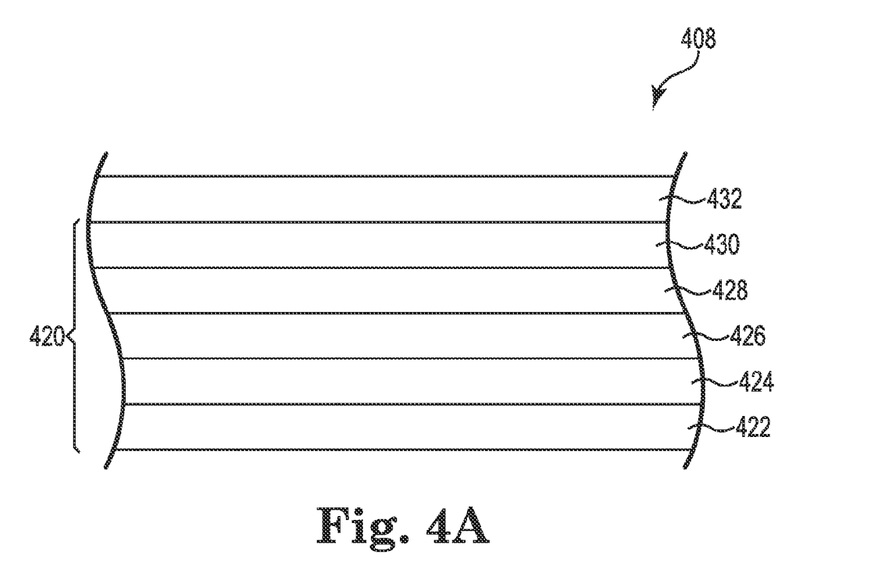
FIG. 4A shows a schematic cross-section of an exemplary disc.

As mentioned above, a disc (also referred to herein as a "disc platter") is used to store data by using a slider to read and/or write data to the disc. In more detail, there are a variety of discs including, e.g., a perpendicular recording medium, a longitudinal recording medium, a heat-assisted magnetic recording (HAMR) medium, a wire assisted magnetic recording (WAMR) medium, or the like. An exemplary disc 408 is shown in FIG. 4A and can include a base 422, a soft underlayer (SUL) 424, a first interlayer 426, a second interlayer 428, and a magnetic recording layer 430. Present on magnetic substrate 420 is a protective overcoat 432 (e.g., a protective carbon overcoat). Exemplary discs are also described in U.S. Ser. No. 13/929,388, having filing date Jun. 27, 2013 (Stoebe et al.), wherein the entirety of said application is incorporated herein for all purposes.

Base 422 may include any material that is suitable to be used in magnetic recording media, including, for example, Al, NiP plated Al, glass, ceramic glass, or the like. Although not shown in FIG. 4A, in some embodiments, at least one additional underlayer may be present in magnetic substrate 420, for example, immediately on top of base 422. Soft underlayer (SUL) 424 may be any soft magnetic material with sufficient saturation magnetization ($B_S$) and low anisotropy ($H_k$). For example, SUL 424 may be an amorphous soft magnetic material such as Ni; Co; Fe; an Fe-containing alloy such as NiFe (Permalloy), FeSiAl, FeSiAlN, or the like; a Co-containing alloy such as CoZr, CoZrCr, CoZrNb, or the like; or a CoFe-containing alloy such as CoFeZrNb, CoFe, FeCoB, FeCoC, or the like. First interlayer 426 and second interlayer 428 may be used to establish an HCP (hexagonal close packed) crystalline orientation that induces HCP (0002) growth of magnetic recording layer 430, with a magnetic easy axis perpendicular to the plane of magnetic storage medium 408. Magnetic recording layer 430 may include Co alloys. For example, the Co alloy may include Co in combination with at least one of Cr, Ni, Pt, Ta, B, Nb, O, Ti, Si, Mo, Cu, Ag, Ge, or Fe. Magnetic recording layer 430 may also include a Fe—Pt alloy, a Sm—Co alloy, or the like. In some embodiments, magnetic recording layer 430 may include a non-magnetic oxide, such as $SiO_2$, $TiO_2$, CoO, $Cr_2O_3$, $Ta_2O_5$, or the like, which separates the magnetic grains. Protective overcoat 432 may be present on magnetic substrate 420. Protective overcoat 432 may be, for example, diamond-like carbon (DLC), which has a crystal lattice similar to diamond, or an amorphous carbon layer. In some embodiments, the protective overcoat may have a {100} crystal plane. The protective overcoat is typically a continuous and non-interrupted layer, devoid of pinholes or other flaws in the coating, having a thickness of at least 30 Angstroms, in some embodiments at least 50 Angstroms.

As explained above with respect to FIG. 1, a slider includes a data reading transducer (also referred to as a read head) and a data recording transducer (also referred to as a write head), which read and write data to a storage disc or medium.

Figure 5A:
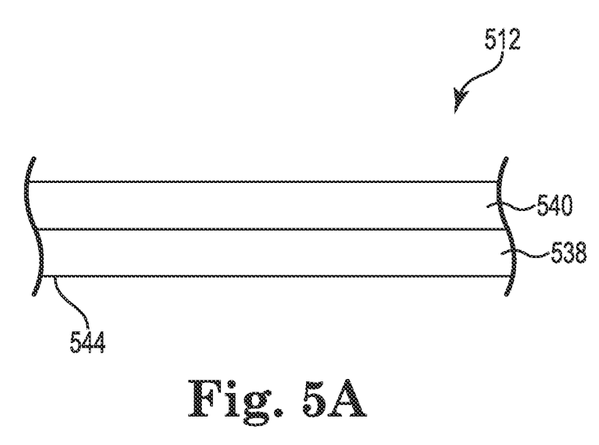
FIG. 5A shows a schematic cross-section of an exemplary slider.

FIG. 5A is a simplified side view diagram of an exemplary slider 512. Slider 512 has a base substrate 540 having a protective layer 538 (e.g., a protective carbon overcoat) that defines lower surface 544. Protective overcoat 538 may form a surface of at least an advanced air bearing (AAB) of slider 512. Protective overcoat 538 may be, for example, diamond-like carbon (DLC) or an amorphous carbon layer. In some embodiments, lower surface 544 of protective overcoat 538 may comprise a {100} crystal plane. In other embodiments, lower surface 544 may comprise another crystal plane. Sliders are well known (see, e.g., U.S. Ser. No. 14/139,438 filed on Dec. 23, 2013 (Ramakrishnan et al.), the entirety of said reference being incorporated herein by reference for all purposes).

Optionally, a protective overcoat as described herein can be treated to modify its properties, e.g., via a doping treatment. Doping treatments are well-known. For example, U.S. Pat. No. 6,312,798 (Ma et al.) discloses that ion beam-deposited, nitrogen-doped C:H films having substantially lower resistivities than undoped ion beam-deposited C:H films and suitable for use as hard, abrasion-resistant overcoat layers for magnetic recording media, such as hard disks, can be formed by supplying a mixture of hydrocarbon and nitrogen gases to an ion beam generator. U.S. Pat. No. 6,312,798 (Ma et al.) is incorporated herein by reference for all purposes.

A disc and/or slider can include at least one coating that reduces or eliminates a potential difference between the head and disc. Exemplary coatings include a lubricant layer, a self-assembled monolayer, and the like.

Lubricants are oftentimes provided as a layer, e.g., molecularly thin layer, on a disc and/or slider to help protect the disc and/or slider, respectively (e.g., the Diamond-like Carbon (DLC) overcoat) from corrosion and/or reduce friction (e.g., so as to minimize wear) between a slider and the disc. Exemplary lubricants can provide hydrophobic and oleophobic coating to, e.g., a DLC overcoat so that the disc has an inert surface for a slider to fly on.

In addition to protecting from corrosion and reducing friction, the chemistry of a lubricant can be selected to as to help reduce the potential difference among a slider and a disc. For example, FIG. 4B (explained in more detail below with respect to Example 1), shows that different disc lubricants can generate a different potential (Vcontact) between an otherwise identical disc and slider. To help identify lubricants that can minimize the potential difference among a slider and a disc, the charge affinity of a lubricant can be evaluated. For example, it is known that friction between materials having different affinities for electric charge can cause a material having a stronger affinity for negative charge to attract electrons and cause electron transfer to the material having the stronger affinity for negative charge. Accordingly, the charge affinity of a lubricant in terms of, e.g., nano Coulombs per Joule can be identified and used to predict the tendency of the lubricant to reduce or minimize the potential difference between a slider and a disc. Charge affinity values of materials, and methods of determining them, are well-known and readily available. For example, charge affinity of a lubricant can be measured using a Kelvin probe. The methodology described below with respect to FIG. 3 can be used where the slider or the disk are used as a probe. Well-known Kelvin probe techniques for determining charge affinity of a material such as a lubricant also include using a standard probe such as gold probe or platinum probe. See, e.g., Nonnenmacher, M., M. P. o'Boyle, and H. K. Wickramasinghe. "Kelvin probe force microscopy." *Applied Physics Letters* 58.25 (1991): 2921-2923.

Exemplary lubricants include perfluoropolyethers such as perfluoropolyalkylether (PFPE). PFPE lubricant can have a bonded portion, which can bind itself to a disc and/or slider surface, and a mobile (not bonded) portion. The bonded portion can provide a permanent coating on the DLC layer to reduce friction and corrosion and help the long-term reliability of the magnetic recording media part of the disc and/or slider. The mobile portion of the lubricant can help replenish lubricant in regions or sites where lubricant depletion may occur.

Exemplary lubricants are commercially available, e.g., PFPE is commercially available under the tradename Fomblin® Z PFPE, and its difunctional derivatives such as Fomblin® Z-DOL, Fomblin® Z-TETROL, and Fomblin® AM, from Solvay.

Methods of applying lubricants to hard disc drives are well known. For example, a lubricant diluting solution can be prepared and applied to a load bar and a head-slider plane by using any of a raising method, a spraying method, a dipping process, a vapor deposition process, a fluid surface descending method, etc. The lubricant diluting solution can be prepared by diluting a lubricant using a diluent fluid such as a solvent available under the trade designation "3M NOVEC Engineered Fluid" from 3M Company, St. Paul, Minn.). According to one preferred lubricant application technique, a lubricant is dissolved in a solvent. Media discs can be dipped into a pool of the solvent/lubricant solution and then removed from the pool. After the solvent evaporates off of the disc surface, the media lubricant remains on the disc. Lubricant application methods are also described in, e.g., U.S. Publication Number 20080124580 (Musashi et al.), wherein the entirety of said publication is incorporated herein by reference for all purposes.

A lubricant coating can have thickness in a range of thicknesses as long as the function of the lubricant is not impaired to an undue degree. An exemplary range of thicknesses include a thickness in the range from greater than zero to 100 angstroms, but may be thinner or thicker depending on the chemistry used for the lubricant. In one embodiment, a lubricant coating can have a thickness in the range of from 1 angstrom to 50 angstroms. In another embodiment, a lubricant coating can have a thickness in the range of from 1 angstrom to 20 angstroms. A lubricant coating may be present on an entire disc surface or only on a portion of the disc. A lubricant coating may be present on an entire air bearing surface or only on a portion of the air bearing surface.

As mentioned, a coating on disc or slider can include a self-assembled monolayer. The terms "self-assembled monolayer" and "SAM" as used herein refer to a thin monolayer coating wherein surface-active molecules present in a reaction solution can be provided (e.g., adsorbed) on a surface (e.g., an air bearing surface and/or a disc surface) to produce chemical bonds therebetween. One major benefit of a SAM coating is that it can help prevent contaminants from entering the space between a head and the media. For example, a SAM coating can be selected to have hydrophobic and oleophobic properties to help repel contaminants such as water.

In addition to reducing or preventing contaminants from entering the space between a slider and a disc, the chemistry of a SAM coating can be selected to as to help reduce the potential difference among a slider and a disc. For example, FIG. 5B (explained in more detail below with respect to Example 2), shows that a SAM coating on a slider can generate a different potential (Vcontact) between an otherwise identical disc and slider. To help identify SAM coatings that can minimize the potential difference among a slider and a disc, the charge affinity of a SAM material can be evaluated. For example, it is known that friction between materials having different affinities for electric charge can cause a material having a stronger affinity for negative charge to attract electrons and cause electron transfer to the material having the stronger affinity for negative charge. Accordingly, the charge affinity of a SAM material in terms of, e.g., nano Coulombs per Joule can be identified and used to predict the tendency of the corresponding SAM coating to reduce or minimize the potential difference between a slider and a disc. Charge affinity values of materials, and methods of determining them, are well-known and readily available. For example, charge affinity of a SAM material can be measured using a Kelvin probe. The methodology described below with respect to FIG. 3 can be used where the slider or the disk are used as a probe. Well-known Kelvin probe techniques for determining charge affinity of a material such as a SAM material also include using a standard probe such as gold probe or platinum probe. See, e.g., Nonnenmacher, M., M. P. o'Boyle, and R K. Wickramasinghe, "Kelvin probe force microscopy." *Applied Physics Letters* 58.25 (1991): 2921-2923.

In some embodiments, a SAM coating can be selected so that the potential difference between a hard disc and a corresponding slider body is 700 mV or less, preferably 500 mV or less, more preferably 200 mV or less, and even more preferably 100 mV or less.

Figure 5B:
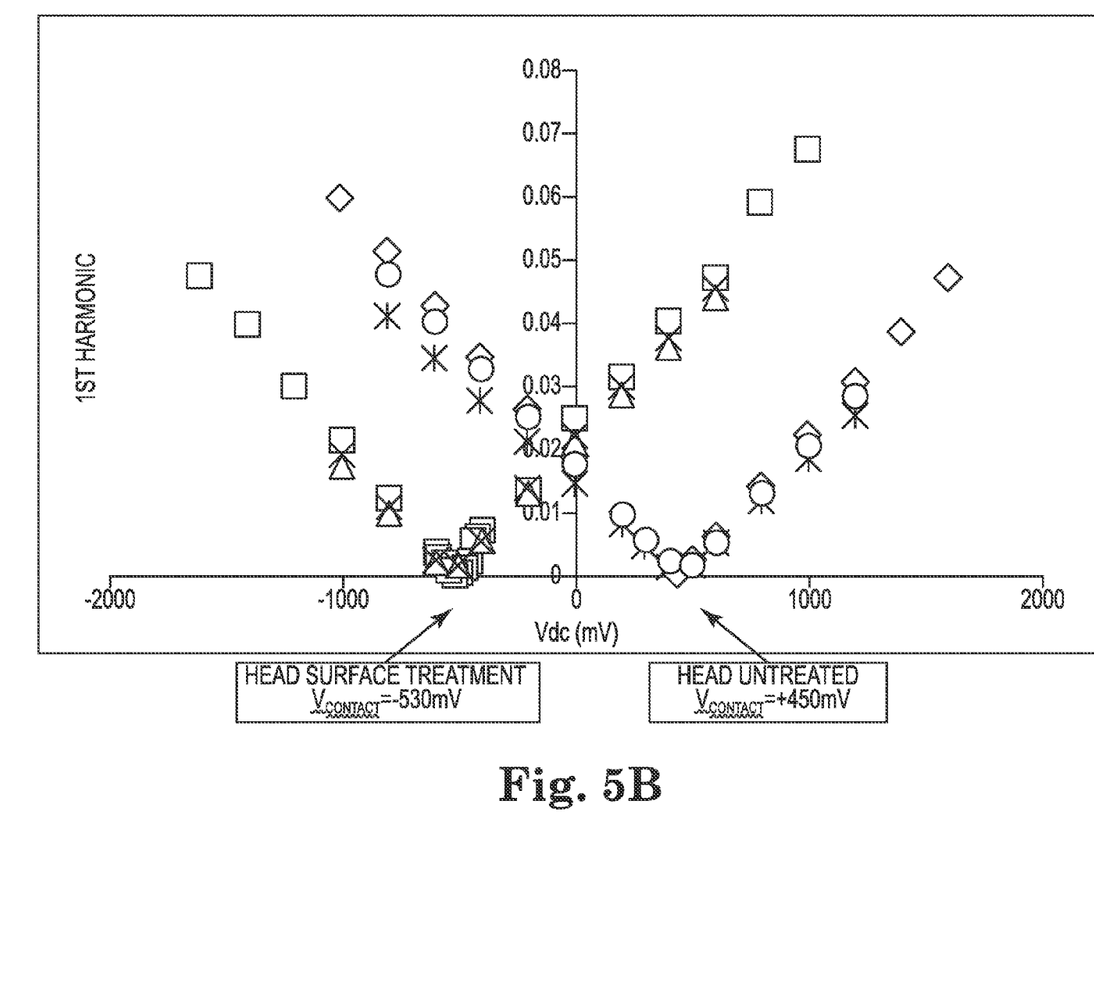
FIG. 5B is a graph that shows that a SAM coating on a slider can generate a different potential (Vcontact) between an otherwise identical disc and slider.
Figure 5C:
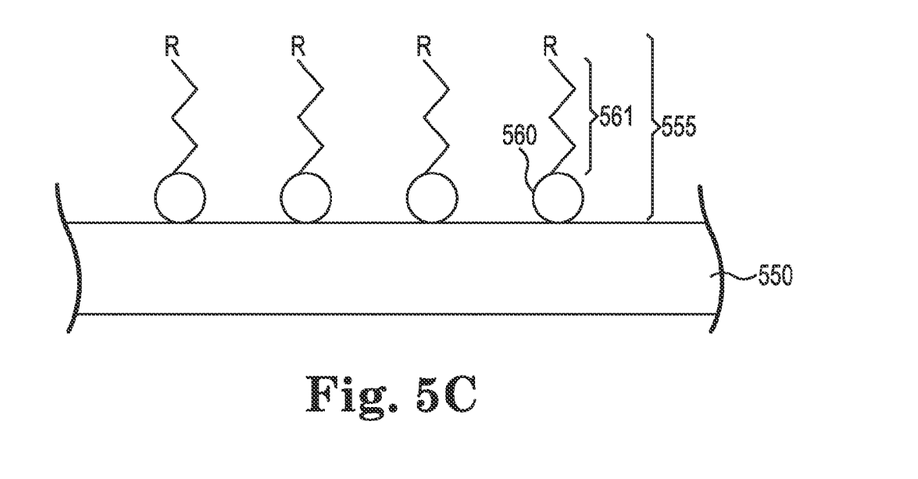
FIG. 5C is a schematic cross-section that illustrates a SAM coating on a substrate.

FIG. 5C illustrates a SAM coating 555 on substrate 550. In general, a SAM coating includes a head group 560, a tail portion 561, and a functional group R at the end of the tail portion 561. As shown, the head groups 560 are adsorbed via chemisorption onto substrate 550, while the tail portions 561 and functional groups R assemble relatively away from substrate 550. In the context of hard disc drives, head groups are preferably selected for desirable chemisorption to a slider and/or a disc, while functional groups are preferably selected to prevent contaminates from entering the space between the slider and disc (as discussed above). In addition, functional groups are also preferably selected to help reduce and/or eliminate potential difference among a slider and a disc. For example, as discussed above, the charge affinity value of a functional group can be evaluated in determining whether it would be a desirable functional group in terms of reducing and/or eliminating potential difference among a slider and a disc.

Exemplary SAM coatings can be made from organic material, preferably a halogenated polymer such as a fluoropolymer (i.e., an organic polymer which contains fluorine). In some embodiments, a functional group is chosen from a fluorocarbon (e.g., a perfluorocarbon), an alkane, an amine, a silicon oxide, other metal oxides, and combinations thereof. For example, in some embodiments, the organic material includes an organosilane (e.g. alkyl trichlorosilane, fluorinated alkyl trichlorosilane, alkyl trialkyloxysilane, fluorinated alkyl trialkyloxysilane, per-fluoro-decyl-trichlorosilane (FDTS), etc.).

A SAM coating can have thickness in a range of thicknesses as long as the function of the SAM is not impaired to an undue degree. An exemplary range of thicknesses include a thickness in the range from greater than zero to 100 angstroms, but may be thinner or thicker depending on the chemistry used for the SAM coating. In one embodiment, a SAM coating can have a thickness in the range of from 1 angstrom to 50 angstroms. In another embodiment, a SAM coating can have a thickness in the range of from 1 angstrom to 20 angstroms. A SAM coating may be present on an entire disc surface or only on a portion of the disc. A SAM coating may be present on an entire air bearing surface or only on a portion of the air bearing surface.

Techniques for applying a SAM to a disc and slider are known and include forming a SAM coating from a vapor phase or a liquid phase. For example, a SAM may be deposited on a surface of a disc or slider in a vacuum chamber using a plasma source, such as, for example, a radio-frequency inductive plasma source, a radio-frequency capacitive plasma source, a DC arc plasma source, a hollow cathode plasma source, microwave plasma source or an electron cyclotron resonance (ECR) plasma source, as described in further detail in U.S. Ser. No. 13/929,388, having filing date Jun. 27, 2013 (Stoebe et al.), wherein the entirety of said application is incorporated herein for all purposes.

A self-assembled monolayer is typically formed using a precursor compound. A precursor compound for forming the self-assembled monolayer or SAM typically includes molecules having a head group, a tail, and functional end group. Common head groups include thiols, silanes, phosphonates, etc. SAMs can be created by chemisorption of the head groups onto the substrate material from either a vapor or liquid phase, by processes such as immersion or dip coating, spraying, chemical vapor deposition (CVD), micro-contact printing, dip-pen nanolithography, etc. The head groups closely assemble on the material with the tail groups extending away from the material.

If deposited from a liquid phase, the precursor compound of the SAM may be present in any conventionally-used organic solvent, water, or any mixture thereof. Examples of suitable organic solvents may include, but are not limited to, alcohols (e.g., methyl alcohol, ethyl alcohol, n-propyl alcohol, isopropyl alcohol, n-butyl alcohol, sec-butyl alcohol, t-butyl alcohol, isobutyl alcohol, and diacetone alcohol); ketones (e.g., acetone, methylethylketone, methylisobutylketone); glycols (e.g., ethyleneglycol, diethyleneglycol, triethyleneglycol, propyleneglycol, butyleneglycol, hexyleneglycol, 1,3-propanediol, 1,4-butanediol, 1,2,4-butantriol, 1,5-pentanediol, 1,2-hexanediol, 1,6-haxanediol); glycol ethers (e.g., ethyleneglycol dimethyl ether, and triethyleneglycol diethyl ether); glycol ether acetates (e.g., propylene glycol monomethyl ether acetate (PGMEA)); acetates (e.g., ethylacetate, butoxyethoxy ethyl acetate, butyl carbitol acetate (BCA), dihydroterpineol acetate (DHTA)); terpineols (e.g., trimethyl pentanediol monoisobutyrate (TEXANOL)); dichloroethene (DCE); chlorobenzene; and N-methyl-2-pyrrolidone (NMP).

The concentration of the precursor compound in the solution may be determined by those skilled in the art according to the intended applications and purposes and may be in the range of about 5 to about 20 mM. An immersion step may be performed without particular limitation and may be carried out at room temperature for about 20 to 80 minutes. Similarly, other methods may be carried out by conventional means.

As mentioned above, a disc and/or slider can include at least one coating (e.g., a lubricant layer and/or a SAM) that has one or more chemical additives that dissipate electrostatic charge and reduce or eliminate a potential difference between a slider and a disc. In addition to dissipating electrostatic charge, it is believed that including such a chemical additive in a coating on a disc and/or slider can scavenge free radicals to mitigate tribocharging at the head-disc interface.

A chemical additive that can dissipate electrical charge due to tribocharging among a slider and disc as described herein can be selected based on a variety of factors including the charge affinity of the chemical additive; the material of the coating (e.g., lubricant and/or SAM) on the disc and/or slider; the material of the slider; the material of the disc; combinations of these and the like. The charge affinity value of a chemical additive can be determined in a manner as described herein above with respect to a lubricant and/or a SAM coating.

Examples of chemical additives that can dissipate electrical charge as described herein can be chosen from antistatic agents, conductive polymers, conducting polymer nanofibers; free-radical scavengers (also referred to as antioxidants); and combinations thereof.

Exemplary antistatic agents includes those based on long-chain aliphatic amines (optionally ethoxylated) and amides, quaternary ammonium salts (e.g., behentrimonium chloride or cocamidopropyl betaine), esters of phosphoric acid, polyethylene glycol esters, or polyols. Exemplary conductive polymers include PEDOT:PSS. Exemplary conducting polymer nanofibers include polyaniline nanofibers. An antioxidant is a molecule that inhibits the oxidation of other molecules and are also referred to as reducing agents or free-radical scavengers. Exemplary antioxidants include thiols, ascorbic acid, polyphenols; substituted phenols; and derivatives of phenylenediamine.

Chemical additives that can dissipate electrical charge can be combined with a disc coating and/or slider coating in a variety of ways. For example, a charge dissipating additive can be applied to a coating as a surface treatment (e.g. via spraying); mixed in with the coating material; and combinations thereof. For surface treatments, the head and media can be assembled first followed by treating the disc coating and/or slider coating with the charge dissipating additive. A surface treatment could be accomplished via spraying, vapor deposition, and combinations thereof. As mentioned, a chemical additive could be mixed with a coating material (a SAM coating material or a lubricant material), and then deposited onto the surface of a slider and/or a disc. If a chemical additive is mixed with a lubricant, the chemical additive is preferably soluble in a solvent that the lubricant is mixed with to form the solvent/lubricant mixture that is then deposited onto the slider and/or disc surface.

Exemplary chemical additives that are commercially available include Endust® anti-static spray available from Norazza Inc., Buffalo, N.Y. and Staticide® anti-static spray available from 3M Company, Maplewood, Minn., both of which can be applied to a coating via spraying.

Figure 6:
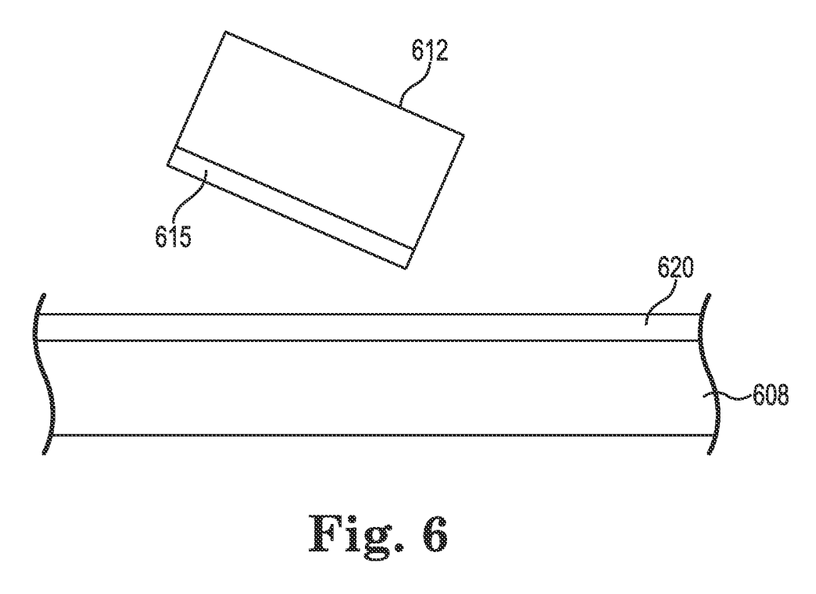
FIG. 6 shows a schematic elevation view of a slider positioned over a disc, where the slider and the disc each include a coating having one or more chemical additives that can dissipate electrical charge.

FIG. 6 shows an example a slider and a disc each having a coating that includes a chemical additive that dissipates electrical charge. As shown, disc 608 includes a coating 620 having one or more chemical additives that can help dissipate electrical charge and a slider 612 that includes a coating 615 having one or more chemical additives that can help dissipate electrical charge.

As described below, FIG. 3 is used to illustrate how electrical potential difference between slider body 301 and a hard disc 302 can be determined by a Kelvin Probe method (see also U.S. Pat. No. 7,016,139 (Baumgart et al.), wherein the entirety of said patent is incorporated herein by reference for all purposes). Generally, a Kelvin probe is a capacitor having one plate vibrating at an AC frequency while the other plate fixed. In the context of a hard disc drive, either a slider body 301 or a hard disc 302 can be used as a Kelvin probe to determine whether there is an electrical potential difference between the slider body 301 and the disc 302. As shown in FIG. 3, disc 302 is indicated as being at ground potential and the slider body 301 is used as a Kelvin probe to determine whether there is an electrical potential difference between the slider body 301 and the disc 302, such as a contact potential caused by tribocharging.

To help illustrate the Kelvin probe method, consider the electrostatic force $F_{el}$ that acts between two parallel conducting plates formed from different materials, which is given by:

$$F_{el} = \frac{\varepsilon_0 \varepsilon_r A}{2d^2} V^2, \quad (1)$$

in which $\varepsilon_0 \varepsilon_r$ is the permeability of the dielectric between the plates, A is the area of the plates, d is the distance of separation of the plates, and V is the potential difference between the plates.

When a slider-disk interface, such as shown in FIG. 3, is modeled by Eq. (1), the potential difference V between the plates, that is, the between slider 301 and the disc 302 is for purposes described herein the sum of an externally applied bias voltage and an internal contact potential $V_{contact}$. Contact potential $V_{contact}$ is the potential difference between the two plates in the absence of an applied voltage and can originate from the plates being made of different materials having different work functions. The work function of a material is the amount of energy that is needed for releasing electrons from the surface of the material, and is related to the optical, electrical and mechanical properties of the material. When two materials having different work functions are brought together and contact each other in a frictional manner, electrons in the material having the higher work function can flow to the material having the lower work function. When the materials subsequently separate into a parallel plate capacitor, equal and opposite surface charges form on each material. The voltage formed between the plates of the capacitor from the equal and opposite surface charges is called a "contact potential".

When one plate (e.g., the conducting part of the disc) is grounded and a bias voltage $V_{bias} = V_{DC} + V_{AC} \sin \omega t$ is applied to the other plate (i.e., the slider body), as shown in FIG. 3, the electrostatic force can be written, after mathematical manipulation, as:

$$F_{el} = \frac{\varepsilon_0 \varepsilon_r A}{4d^2} [2(V_{DC} + V_{contact})^2 + \quad (2)$$
$$4V_{AC}(V_{DC} + V_{contact})\sin\omega t - V_{AC}^2 \cos 2\omega t + V_{AC}^2]$$

The first and last terms within the square brackets in Eq. (2) represent the DC response to the applied bias voltage $V_{bias}$, the second term represents the first harmonic response to $V_{bias}$, and the third term in square brackets represents the second harmonic response to $V_{bias}$. The first harmonic term becomes zero when the DC component of the applied bias voltage $V_{bias}$ cancels the contact potential $V_{contact}$, i.e., $V_{DC} = -V_{contact}$. The second harmonic term, however, is independent of the applied DC voltage.

The work functions of each of the slider and disc can be modified via the coatings (lubricants and/or SAM coatings), and/or coatings that include chemical additives that can dissipate electrical charge that are described herein above. Such coatings and/or additives can be selected to modify the contact potential $V_{contact}$ in a manner that reduces, minimizes, or even causes the contact potential $V_{contact}$ to be substantially zero.

Optionally, in addition to selecting one or more of a coating (e.g., SAM and/or lubricant) and a chemical additive for a coating that dissipates electrical charge, a bias voltage source can be applied between a slider body and a disc to help eliminate a potential difference among the slider and the disc. Typically, the bias voltage includes at least a DC component and an AC component. Applying such a bias voltage is well known. See, e.g., U.S. Pat. No. 7,016,139 (Baumgart et al.), wherein the entirety of said patent is incorporated herein by reference for all purposes).

EXAMPLES

Example 1

Figure 4B:
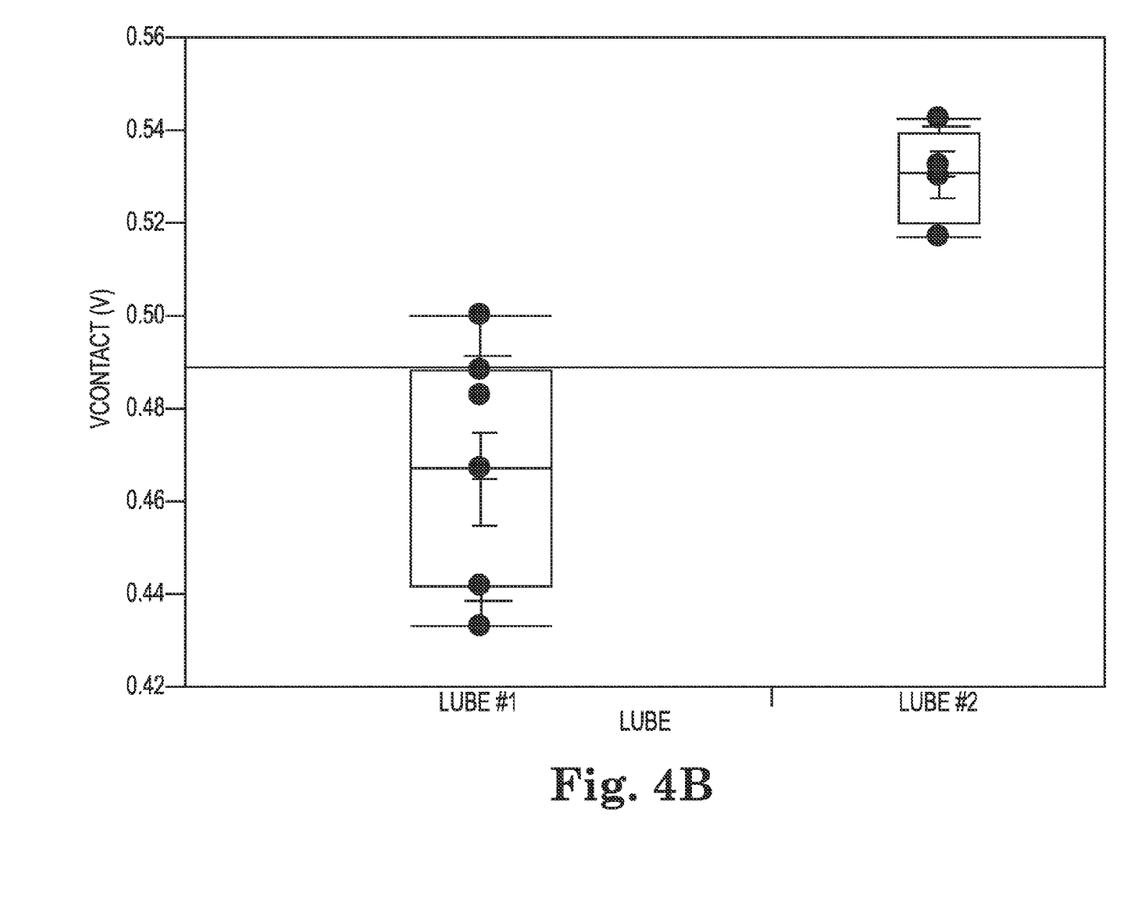
FIG. 4B is a graph that shows that different disc lubricants can generate a different potential (Vcontact) between an otherwise identical disc and slider.

Example 1 shows that different disc lubricants can generate a different potential (Vcontact) between an otherwise identical disc and slider. Identical sliders and discs were used in Example 1. The sliders were standard untreated sliders. The discs were standard glass media with magnetic recording layers. One disc media had a first lubricant and another disc media had a second disc lubricant that was different from the first lubricant. The first lubricant was D4OH (described in U.S. Pub. No.: 20130083422 (Ooeda et al.), wherein the entirety of said publication is incorporated herein by reference for all purposes. The second lubricant was NMW. As shown in FIG. 4B, the first lubricant modified the work potential of the disc such that the contact potential $V_{contact}$ was less (i.e., reduced by 65 mV) for disc having the first lubricant than the disc having the second lubricant.

Example 2

Example 2 shows that a SAM coating on a slider can generate a different potential ($V_{contact}$) between an otherwise identical disc and slider. Identical sliders and discs were used in Example 2. The sliders were standard sliders. One slider did not have a SAM coating and the other slider had SAM coating. The SAM coating was per-fluoro-decyl-trichlorosilane (FDTS) The discs were standard glass media with magnetic recording layers and coated with NMW lube. FIG. 5B includes the first harmonic plotted against the VDC. As shown in FIG. 5B, the SAM coating modified the work potential of the slider such that the contact potential $V_{contact}$ was less (i.e., in a 980 mV reduction in the measured contact potential) for slider having the SAM coating than slider that did not have the slider coating (i.e., "untreated").

What is claimed is:

1. A hard disc drive comprising:
   a) a hard disc drive platter having at least one major surface, wherein at least a portion of the major surface comprises at least one coating, wherein the coating comprises a lubricant comprising a perfluoropolyether in admixture with one or more additives that can dissipate electrical charge; and
   b) a slider body having air bearing surface positioned to face the at least one major surface of the hard disc drive platter, wherein at least a portion of the air bearing surface comprises:
      i) a carbon overcoat surface; and
      ii) a surface coating layer overlying the carbon overcoat surface, wherein the surface coating layer has a thickness of from greater than zero to 50 angstroms, wherein the surface coating layer comprises an organosilane compound having a functional group selected from the group consisting of a halogen group, an alkyl group, an amine group, a silicon dioxide group, and combinations thereof.

2. The hard disc drive of claim 1, wherein a surface of the lubricant coating has been treated with the one or more additives that can dissipate electrical charge.

3. The hard disc drive of claim 2, wherein a surface of the lubricant coating has been sprayed with the one or more additives that can dissipate electrical charge.

4. The hard disc drive of claim 1, wherein the lubricant has a thickness in the range from greater than 0 to 50 angstroms.

5. The hard disc drive of claim 1, wherein the at least one coating comprises a self-assembled monolayer.

6. The hard disc drive of claim 5, wherein the at least one coating comprises the self-assembled monolayer in admixture with the one or more additives that can dissipate electrical charge.

7. The hard disc drive of claim 5, wherein a surface of the self-assembled monolayer has been treated with the one or more additives that can dissipate electrical charge.

8. The hard disc drive of claim 7, wherein a surface of the lubricant coating has been sprayed with the one or more additives that can dissipate electrical charge.

9. The hard disc drive of claim 5, wherein the self-assembled monolayer has a thickness in the range from 1 to 100 angstroms.

10. The hard disc drive of claim 1, wherein the one or more additives are chosen from antistatic agents, conductive polymers, conducting polymer nanofibers, antioxidants, and combinations thereof.

11. The hard disc drive of claim 1, wherein the organosilane compound is selected from the group consisting of alkyl trichlorosilane, fluorinated alkyl trichlorosilane, alkyl trialkyloxysilane, fluorinated alkyl trialkyloxysilane, and per-fluoro-decyl-trichlorosilane.

12. The hard disc drive of claim 1, wherein the surface coating layer further comprises a chemical additive that can dissipate electrical charge, wherein the chemical additive is selected from the group consisting of antistatic agents, conductive polymers, conducting polymer nanofibers, antioxidants, and combinations thereof.

13. A hard disc drive comprising:
   at least one hard disc having at least one major surface, wherein at least a portion of the major surface comprises at least one coating, wherein the coating comprises a lubricant comprising a perfluoropolyether in admixture with one or more additives that can dissipate electrical charge;
   at least one slider body corresponding to each hard disc, wherein the slider body comprises:
      an air bearing face, wherein the air bearing face comprises a leading edge, a trailing edge, and an air bearing surface, wherein at least a portion of the air bearing surface comprises:
         a) a carbon overcoat surface; and
         b) at least one self-assembled monolayer overlying the carbon overcoat surface, wherein the monolayer has a thickness of from greater than zero to 50 angstroms, wherein the monolayer comprises an organosilane compound having a functional group selected from the group consisting of a halogen group, an alkyl group, an amine group, a silicon dioxide group, and combinations thereof;
      at least one side face; and
      a trailing edge face that is adjacent to the trailing edge of the air bearing face, wherein the potential difference between the at least one hard disc and the corresponding at least one slider body is 700 mV or less.

14. The hard disc drive of claim 13, further comprising a bias voltage source in electrical communication with the at least one hard disc or the at least one slider body, wherein the bias voltage source can apply a predetermined bias voltage to help reduce a potential difference among the at least one hard disc and the at least one slider body.

15. A method of reducing a potential difference among an air bearing surface of a slider body and a hard disc drive platter comprising providing a hard disc drive platter having at least one major surface, wherein at least a portion of the major surface comprises at least one coating, wherein the coating comprises a lubricant comprising a perfluoropolyether in admixture with one or more additives that can dissipate electrical charge, wherein the air bearing surface comprises a carbon overcoat surface and a surface coating layer overlying the carbon overcoat surface, wherein the surface coating layer has a thickness of from greater than zero to 50 angstroms, wherein the surface coating layer comprises an organosilane compound having a functional group selected from the group consisting of a halogen group, an alkyl group, an amine group, a silicon dioxide group, and combinations thereof.

16. The method of claim 15, further comprising:
   providing a bias voltage source in electrical communication with the hard disc drive platter or the slider body; and
   applying a predetermined bias voltage to help reduce a potential difference among the hard disc drive platter and the slider body.

* * * * *